United States Patent
Lai et al.

(10) Patent No.: US 11,351,993 B2
(45) Date of Patent: Jun. 7, 2022

(54) SYSTEMS AND METHODS FOR ADAPTING A DRIVING ASSISTANCE SYSTEM ACCORDING TO THE PRESENCE OF A TRAILER

(71) Applicant: DENSO CORPORATION, Kariya (JP)

(72) Inventors: Ting-Yu Lai, Ann Arbor, MI (US); Ryo Takaki, Southfield, MI (US); Bo Sun, Farmington Hills, MI (US)

(73) Assignee: Denso Corporation, Aichi (JP)

( * ) Notice: Subject to any disclaimer, the term of this patent is extended or adjusted under 35 U.S.C. 154(b) by 190 days.

(21) Appl. No.: 16/745,603

(22) Filed: Jan. 17, 2020

(65) Prior Publication Data
US 2021/0221363 A1 Jul. 22, 2021

(51) Int. Cl.
| | | |
|---|---|---|
| *B60W 30/09* | (2012.01) | |
| *G08G 1/16* | (2006.01) | |
| *B60W 30/12* | (2020.01) | |
| *B60W 30/095* | (2012.01) | |
| *B60Q 9/00* | (2006.01) | |

(52) U.S. Cl.
CPC .............. *B60W 30/09* (2013.01); *B60Q 9/008* (2013.01); *B60W 30/0956* (2013.01); *B60W 30/12* (2013.01); *G08G 1/16* (2013.01); *B60W 2300/14* (2013.01); *B60W 2554/4041* (2020.02); *B60W 2554/4042* (2020.02)

(58) Field of Classification Search
CPC .. B60W 30/09; B60W 30/12; B60W 30/0956; B60W 2554/4042; B60W 2300/14; B60W 2554/4041; B60W 10/18; B60W 10/04; B60W 10/20; B60W 30/095; B60W 2530/203; B60W 2530/205; G08G 1/16; B60Q 9/008

See application file for complete search history.

(56) References Cited

U.S. PATENT DOCUMENTS

| | | |
|---|---|---|
| 9,821,845 B2 | 11/2017 | Xu et al. |
| 9,937,861 B2 | 4/2018 | Shehan et al. |
| 10,286,916 B2 | 5/2019 | Prasad et al. |
| 2009/0125182 A1 | 5/2009 | Hoetzer et al. |
| 2016/0101730 A1* | 4/2016 | Shehan ................ G01S 13/931 340/431 |
| 2017/0363727 A1* | 12/2017 | Prasad .................. G08G 1/167 |
| 2018/0105172 A1 | 4/2018 | Gesch et al. |

(Continued)

FOREIGN PATENT DOCUMENTS

WO 2019050448 A1 3/2019

*Primary Examiner* — Peter D Nolan
*Assistant Examiner* — Ashley L Redhead, Jr.
(74) *Attorney, Agent, or Firm* — Christopher G. Darrow; Darrow Mustafa PC

(57) ABSTRACT

Systems, methods, and other embodiments described herein relate to generating depth estimates of an environment depicted in a monocular image. In one embodiment, a method includes identifying semantic features in the monocular image according to a semantic model. The method includes injecting the semantic features into a depth model using pixel-adaptive convolutions. The method includes generating a depth map from the monocular image using the depth model that is guided by the semantic features. The pixel-adaptive convolutions are integrated into a decoder of the depth model. The method includes providing the depth map as the depth estimates for the monocular image.

19 Claims, 8 Drawing Sheets

(56) References Cited

U.S. PATENT DOCUMENTS

| | | |
|---|---|---|
| 2018/0273034 A1 | 9/2018 | Gesch et al. |
| 2018/0356214 A1 | 12/2018 | Kozak et al. |
| 2019/0210418 A1 | 7/2019 | Hall et al. |
| 2019/0322275 A1* | 10/2019 | Ondruska .......... G06K 9/00671 |
| 2021/0070362 A1* | 3/2021 | Xu ..................... B62D 15/0265 |
| 2021/0078504 A1* | 3/2021 | Skaradzinski ......... H04N 7/183 |

* cited by examiner

SYSTEMS AND METHODS FOR ADAPTING A DRIVING ASSISTANCE SYSTEM ACCORDING TO THE PRESENCE OF A TRAILER

TECHNICAL FIELD

The subject matter described herein relates in general to systems and methods for adapting the operation of a driving assistance system within a vehicle and, more particularly, to detecting the presence of a trailer attached to the vehicle and adapting the driving assistance system according to the presence of the trailer.

BACKGROUND

Vehicles may employ various systems to assist in controlling the vehicle and protecting passengers, such as advanced driving-assistance systems (ADAS), and/or other assistive/warning systems. These systems improve the safety of the passengers and may improve the ease with which a driver controls the vehicle. Such systems generally rely on perceptions of sensors to monitor for various conditions (e.g., the presence of an object in a blind spot, an object having a particular trajectory, etc.) for which a system may generate an alert, generate a vehicle control input, or perform some other function. However, when a field-of-view of the sensor is obstructed due to, for example, the vehicle towing a trailer, then the operation of the noted systems may be frustrated. That is, because the field-of-view for one or more sensors is likely obstructed by the presence of the trailer, defined activation zones, and/or other mechanisms of action for the systems may generate false positive detections because of the trailer being located within a defined zone or the ADAS may simply not function because of the presence of the trailer. This can further complicate the process of towing a trailer, which intrinsically elevates safety concerns alone without consideration to potentially disabling ADAS or other safety-based systems. Accordingly, towing a trailer may complicate the use of various safety/assistance systems through obscuring sensors used by the systems to function.

SUMMARY

In one embodiment, example systems and methods associated with adapting the operation of a driving assistance system according to a presence of a trailer are disclosed. As previously noted, when a vehicle connects to a trailer for purposes of towing, the volume of the trailer may block one or more sensors from perceiving areas behind the vehicle. In general, this may impact activation zones for various ADAS or warning functions (e.g., blind-spot monitoring) such that the system cannot perceive areas due to the trailer occluding a line of sight of the sensors. Thus, the noted systems may not function or may function with limited ability because of the occlusion that the trailer causes.

Therefore, in one embodiment, a disclosed approach improves the functioning of ADAS and other systems when a vehicle is towing a trailer. For example, in one embodiment, a system initially detects the presence of the trailer (e.g., when the trailer is connected) and attributes of the trailer. In general, the attributes include dimensions of the trailer, such as length, width, and height. From this information, the system can adjust system parameters for how the ADAS and/or other similar systems function. That is, the system can adjust areas of activation zones and other parameters that control the operation of the noted systems. Accordingly, in at least one aspect, the system generates a restricted zone around the trailer that is used as an area within which perceptions of the sensors may be ignored.

The system, in one approach, operates by acquiring sensor data from the sensors and identifying nearby objects. The system can estimate paths of the nearby objects and use the adjusted system parameters to determine whether to activate the various functions of the driving assistance systems. When the system determines that a nearby object is to activate an assistance system, the system may undertake a further analysis to determine whether the estimated path intersects with the trailer. If the estimated path does intersect with the trailer, then the system may disregard the nearby object instead of activating the assistance system since such a trajectory is generally considered to be erroneous due to the presence of the trailer. In this way, the disclosed approach functions to improve the safety of the subject vehicle by adapting the function of the driving assistance systems according to the presence of a trailer, thereby avoiding false detections while retaining the general functioning of the driving assistance systems.

In one embodiment, a trailer assistance system for adapting operation of a driving assistance system according to a presence of a trailer is disclosed. The trailer assistance system includes one or more processors and a memory that is communicably coupled to the one or more processors. The memory stores a detection module including instructions that when executed by the one or more processors cause the one or more processors to adjust system parameters according to attributes of a trailer connected with the subject vehicle. The system parameters control operation of the driving assistance system of the subject vehicle. The detection module includes instructions to, in response to detecting a nearby object from sensor data about a surrounding environment of the subject vehicle, estimate a path of the nearby object. The trailer assistance system includes a warning module including instructions that when executed by the one or more processors cause the one or more processors to activate the driving assistance system according to the system parameters when i) the estimated path satisfies an activation threshold and ii) the estimated path does not intersect a restricted zone of the trailer.

In one embodiment, a non-transitory computer-readable medium is disclosed. The computer-readable medium stores instructions that when executed by one or more processors cause the one or more processors to adapt operation of an assistance system according to a presence of a trailer. The instructions include instructions to adjust system parameters according to attributes of a trailer connected with the subject vehicle. The system parameters control operation of the driving assistance system of the subject vehicle. The instructions include instructions to, in response to detecting a nearby object from sensor data about a surrounding environment of the subject vehicle, estimate a path of the nearby object. The instructions include instructions to activate the driving assistance system according to the system parameters when i) the estimated path satisfies an activation threshold and ii) the estimated path does not intersect a restricted zone of the trailer.

In one embodiment, a method of adapting operation of a driving assistance system according to a presence of a trailer is disclosed. In one embodiment, a method includes adjusting system parameters according to attributes of a trailer connected with the subject vehicle. The system parameters control operation of the driving assistance system of the subject vehicle. The method includes, in response to detecting a nearby object from sensor data about a surrounding environment of the subject vehicle, estimating a path of the nearby object. The method includes activating the driving assistance system according to the system parameters when i) the estimated path satisfies an activation threshold and ii) the estimated path does not intersect a restricted zone of the trailer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
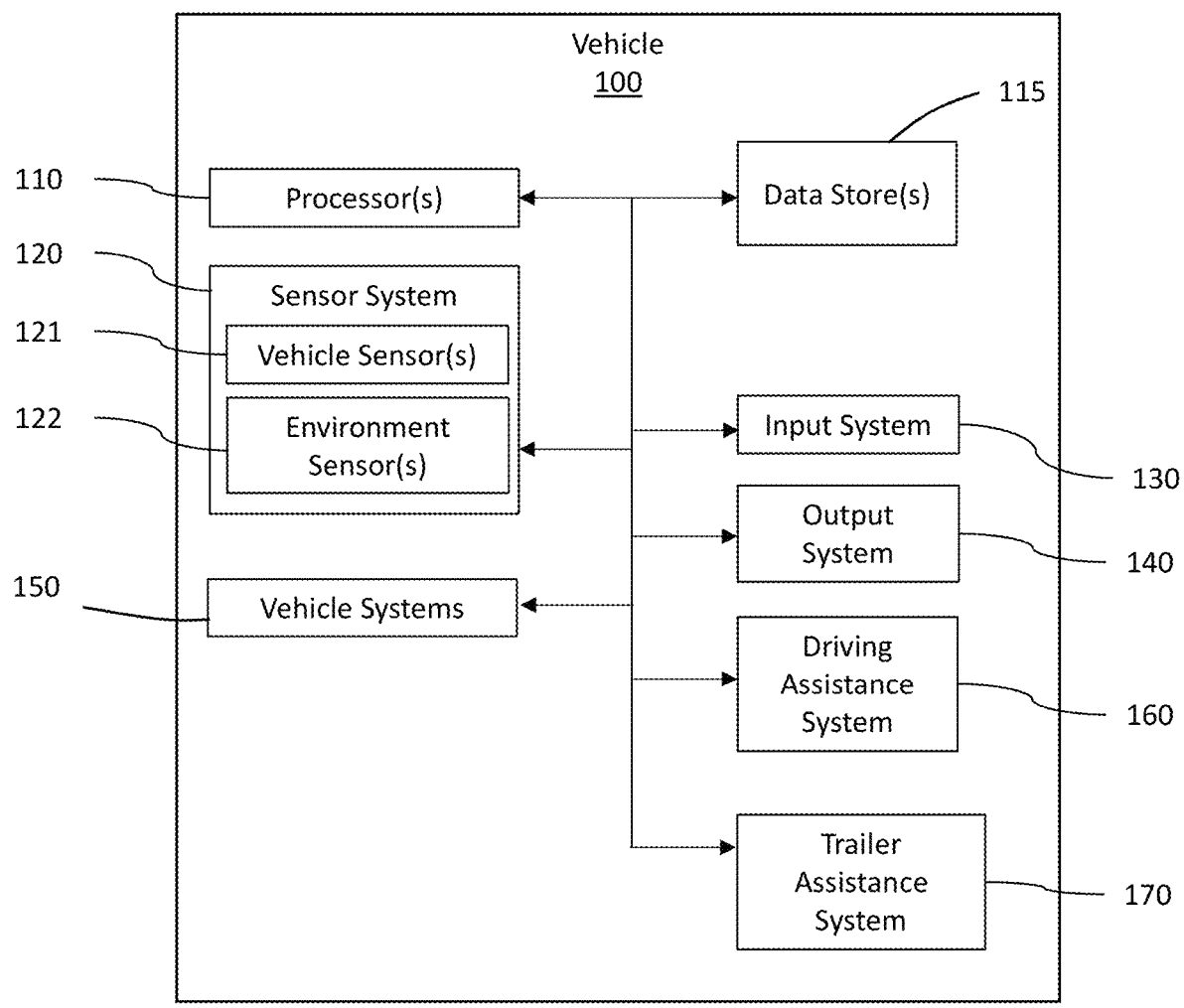
FIG. 1 illustrates one embodiment of a configuration of a vehicle in which example systems and methods disclosed herein may operate.

Systems, methods, and other embodiments associated with adapting the operation of driving assistance systems according to the presence of a trailer are disclosed. As previously noted, when a vehicle tows a trailer, the trailer may block one or more sensors from perceiving areas behind the vehicle. In general, the occlusion from the trailer may impact various functions of driving assistance systems (e.g., ADAS) such that the systems may not function or may function with limited abilities.

Therefore, in one embodiment, a trailer assistance system improves the functioning of driving assistance-related systems when a vehicle is towing a trailer. For example, in one embodiment, a system initially detects the presence of the trailer (e.g., when the trailer is connected) and attributes of the trailer. In general, the attributes include dimensions of the trailer, such as length, width, and height. In one approach, the system may leverage the available sensors to automatically identify when the trailer connects with the vehicle. In further aspects, the presence of the trailer and the attributes of the trailer are defined by an electronic input from, for example, a driver of the vehicle. In any case, the trailer assistance system uses the attributes to, for example, adjust system parameters for how the driving assistance system functions. As a preliminary matter, it should be appreciated that the driving assistance system may include different functions such as blind-spot monitoring, lane change assist, rear cross-traffic detection, and so on.

Thus, the trailer assistance system adjusts the system parameters to account for the presence of the trailer and particular aspects of how the driving assistance system functions by, for example, adapting activation zones, thresholds, and other aspects of how the driving assistance system determines when to activate alerts/controls. In one aspect, the trailer assistance system defines a restricted zone around the trailer that acts as a mask. The mask defines an area including the trailer within which the activation zones are restrained from extending and within which the trailer assistance system considers estimated paths to be, for example, invalid due to the presence of the trailer.

The trailer assistance system, in one approach, then operates in conjunction with the driving assistance system by acquiring sensor data from the sensors and identifying nearby objects. The trailer assistance system can estimate paths of the nearby objects and use the adjusted system parameters to determine whether to activate the various functions of the driving assistance systems. That is, the trailer assistance system may determine whether an estimated path of a nearby object intersects with an activation zone that is, in one or more instances, an area near the vehicle associated with the nearby object being a threat (e.g., blind spot, rear cross-traffic area, passenger exit areas, etc.).

When the trailer assistance system determines that a nearby object is, for example, a hazard or is to otherwise activate the driving assistance system, the trailer assistance system may undertake a further analysis to determine whether the estimated path intersects with the trailer or the restricted zone defined about the trailer. That is, as the driving assistance system is originally configured to consider the area of the trailer as an area of free movement behind the vehicle, the connection with a trailer can further interfere with the way in which the driving assistance system considers the movement of the nearby object form one side of the vehicle to another. Thus, if the estimated path intersects with the trailer, then the system may disregard the nearby object instead of activating the driving assistance system since such a trajectory is generally considered to be erroneous due to the presence of the trailer. In this way, the disclosed approach functions to improve the safety of the subject vehicle by adapting the functioning of the driving assistance systems according to the presence of a trailer, thereby avoiding false detections while improving safety through permitting the use of the driving assistance system when towing.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, tows a trailer, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 (also referred to as the subject vehicle herein) includes a trailer assistance system 170 that functions to improve the safety of the vehicle 100 when towing a trailer by adapting the operation of a driver assistance system to account for the trailer. Moreover, while depicted as a standalone component, in one or more embodiments, the trailer assistance system 170 is integrated with the driving assistance system 160, or another similar system of the vehicle 100. The driving assistance system 160 is, in one embodiment, an advanced driving-assistance system (ADAS), or similar system that functions to track nearby objects using sensors that can become occluded when towing a trailer. The noted functions and methods will become more apparent with a further discussion of the figures.

Figure 2:
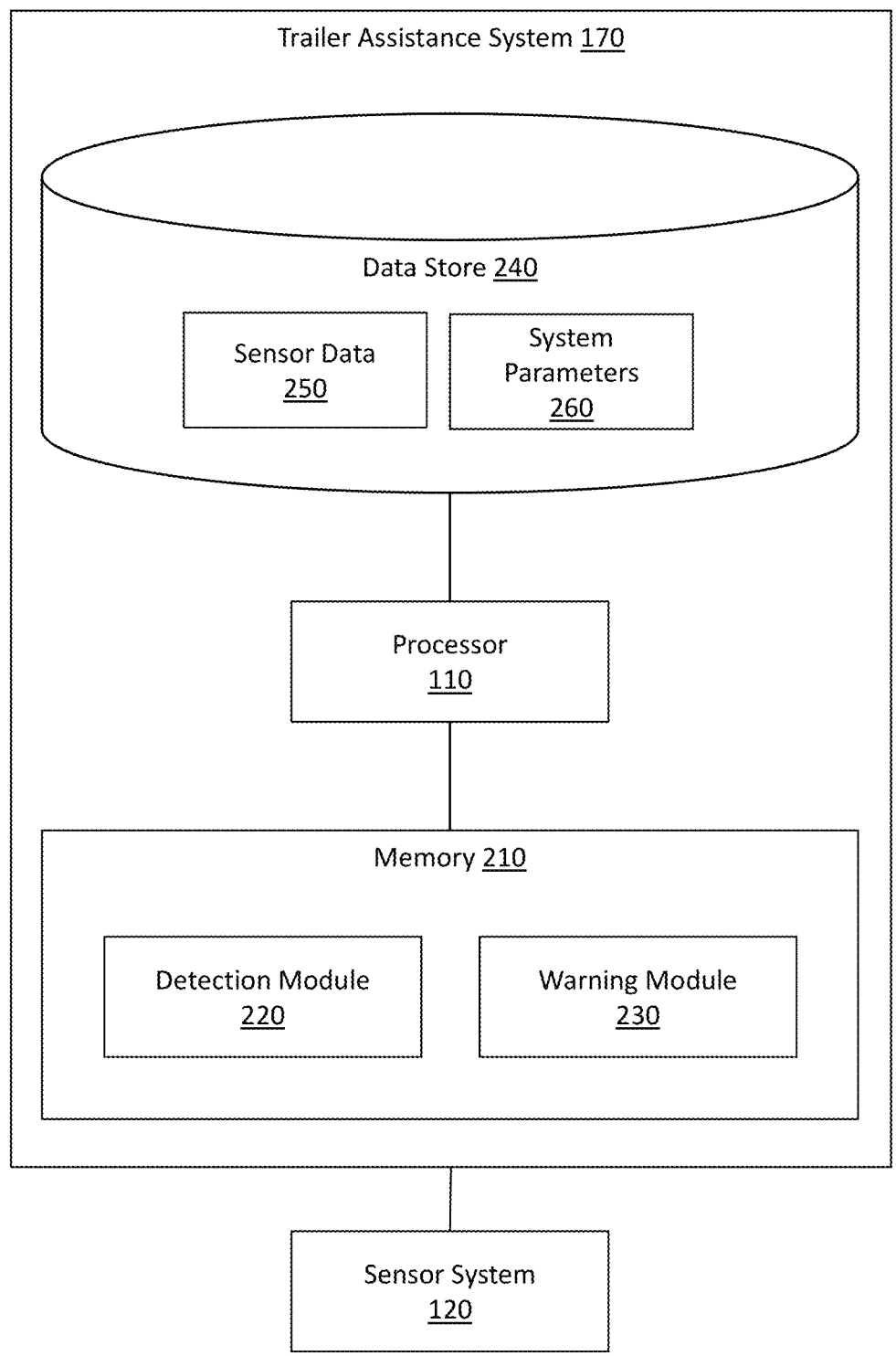
FIG. 2 illustrates one embodiment of a trailer assistance system that is associated with adapting the operation of a driving assistance system according to the presence of a trailer.

With reference to FIG. 2, one embodiment of the trailer assistance system 170 is further illustrated. As shown, the trailer assistance system 170 includes a processor 110. Accordingly, the processor 110 may be a part of the trailer assistance system 170 or the trailer assistance system 170 may access the processor 110 through a data bus or another communication pathway. In one or more embodiments, the processor 110 is an application-specific integrated circuit that is configured to implement functions associated with a detection module 220 and a warning module 230. More generally, in one or more aspects, the processor 110 is an electronic processor such as a microprocessor that is capable of performing various functions as described herein when loading the noted modules and executing encoding functions associated therewith.

In one embodiment, the trailer assistance system 170 includes a memory 210 that stores the detection module 220 and the warning module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware such as processing components (e.g., controllers), circuits, etc. for independently performing one or more of the noted functions.

Furthermore, in one embodiment, the trailer assistance system 170 includes a data store 240. The data store 240 is, in one embodiment, an electronically-based data structure for storing information. For example, in one approach, the data store 240 is a database that is stored in the memory 210 or another suitable medium, and that is configured with routines that can be executed by the processor 110 for analyzing stored data, providing stored data, organizing stored data, and so on. In either case, in one embodiment, the data store 240 stores data used by the modules 220 and 230 in executing various functions. In one embodiment, the data store 240 includes sensor data 250, and system parameters 260 (e.g., thresholds, activation zones, blind spot models, timing selections, etc.) along with, for example, other information that is used by the modules 220 and 230.

Accordingly, the detection module 220 generally includes instructions that function to control the processor 110 to acquire data inputs from one or more sensors (e.g., sensor system 120) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or other area within which the vehicle 100 is traveling.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors.

In addition to locations of nearby vehicles, the sensor data 250 may also include, for example, information about lane markings, velocities of nearby objects/vehicles, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, depending on the particular implementation, the subject sensors may have a field-of-view that is limited to a rear area behind the vehicle 100, an area alongside the vehicle 100, and so on.

The sensor data 250 may include varying forms of observations about the surrounding environment that the detection module 220 derives from a single type of sensor (e.g., a radar sensor) or that the detection module 220 derives from fusing sensor data from multiple sources (e.g., monocular camera, stereo camera, LiDAR, radar, ultrasonic, etc.). In any case, the sensor data 250 provides observations of the surrounding environment to support detection, identification, and localization of the nearby objects.

In addition to providing observations of the surrounding environment, the sensor data 250, in at least one approach, further includes signals identifying various events associated with the vehicle 100 such as the connection of a trailer with the vehicle 100. The particular sensor that perceives the connection with the trailer may be a purpose-built sensor that detects the physical connection and/or electrical connection of the trailer with the vehicle 100, or may be a general type of sensor, such as a camera or radar that senses the trailer. In any case, once the detection module 220 identifies the connection of the trailer with the vehicle 100, the detection module 220 further determines attributes of the trailer to use in adjusting the system parameters 260. The detection module 220 may use images, radar returns, or other sensor data to estimate a length, width, and height of the trailer so that the detection module 220 can assess an impact on the field-of-view (FOV) for one or more sensors, and, thus, how the trailer may influence operation of the driving assistance system 160. In an alternative approach, the detection module 220 identifies the connection of the trailer and the attributes of the trailer according to a manual input. That is, for example, an operator of the vehicle 100 may electronically enter the attributes of the trailer via an electronic input into, for example, a head unit of the vehicle 100.

In any case, the detection module 220 uses the attributes to determine an area of the FOV that the trailer occludes. From this assessment of the occluded area, the detection module 220 defines, in one embodiment, a restricted zone for the trailer. In general, the restricted zone is an area associated with the trailer that is masked from consideration by the driving assistance system 160 when the trailer is present. Thus, the restricted zone can define an area that directly corresponds with the trailer or that extends beyond the actual area of the trailer depending on how the trailer is positioned relative to a line-of-sight of the sensor, and, thus, depending on how the trailer effects the FOV. As will be discussed in greater detail subsequently, the boundaries of the restricted zone can be varied depending on the type of the nearby object in order to account for potentially erratic movements of the object relative to the trailer.

Accordingly, the detection module 220 adjusts the system parameters 260 as a function of the attributes of the trailer. For example, in one aspect, the detection module 220 adapts activation zones, thresholds, and/or other aspects of the driving assistance system 160. In other words, the detection module 220 may resize activation zones to avoid overlap with the restricted zone, may adapt blind spots according to the trailer, and so on. In yet further aspects, the detection module 220 can adjust the system parameters 260, and by extension the activation zones, according to the trailer attributes, vehicle heading, road shape, and so on. In this way, the system 160 is adapted to avoid delivering alerts or other outputs for anything detected in the area of the trailer, and can thereby avoid false detections.

Continuing with the sensor data 250, the detection module 220 processes the sensor data 250 to detect the nearby objects. The nearby objects can include various types of objects such as vehicular (e.g., automobiles, trucks, motorcycles, etc.), non-vehicular (e.g., pedestrians, animals, bicycles, etc.), and even inanimate objects (e.g., road debris, potholes, etc.). Whichever objects makeup the detected nearby objects, the trailer assistance system 170 generally functions to assist an operator and/or passenger of the vehicle 100 by improving situational awareness and/or providing assistive control inputs to avoid hazards associated with the nearby object.

Of course, it should be appreciated that while the trailer assistance system 170 is discussed as performing the noted functions, the trailer assistance system 170 may perform the noted functions in cooperation with the driving assistance system 160 and/or the driving assistance system 160 may separately perform some of the noted functions. As previously described, in one or more approaches, the system 160 and the system 170 may be integrated together to provide for performing the various functions described herein. Moreover, while the present disclosure generally describes the trailer assistance system 170 within the context of detecting a single nearby object, it should be appreciated that the trailer assistance system 170 may detect and provide alerts for any number of vehicles and/or other objects in a surrounding environment. For example, in various examples, the trailer assistance system 170 may detect two, three, four, or more objects including vehicles and other types of objects for which the system 170 executes the noted determinations.

In any case, the detection module 220, as noted, generally functions to detect a nearby object and determine the characteristics of the object from the sensor data 250. The characteristics generally include at least a current position relative to the vehicle 100, and a velocity (i.e., speed and direction). In additional aspects, the detection module 220 may further determine more complex trajectories that are, for example, extrapolated from multiple prior observations (e.g., over two or more prior time steps). In any case, the detection module 220 generally uses the position and velocity information about the nearby object to predict future positions of the objects from which the warning module 230 determines whether the nearby object satisfies a threshold (e.g., activation threshold). The activation threshold may be associated with an activation zone and determining whether the estimated path is to pass into the activation zone within a defined time horizon (e.g., <=5.0 s).

In yet further aspects, the detection module 220 may determine a particular type of the object, such as a vehicle, non-vehicular object, and inanimate object/obstacle. In one or more embodiments, the detection module 220 provides the particular type with a further granularity to specify the type as a specific class within the separate noted categories. For example, the detection module 220 may specify the object is an automobile, a semi-truck, a motorcycle, or another class of vehicle. Similarly, the detection module 220 may also indicate the type of the object with a finer-granularity of identification in relation to non-vehicular (e.g., pedestrian, animal, bicycle, etc.) and inanimate objects (e.g., road debris, pothole, etc.). To achieve the classification of type/class, the detection module 220 may implement one or more machine learning algorithms (e.g., convolutional neural networks) that process the sensor data 250 (e.g., images) and generate the classifications. In further aspects still, the detection module 220 may determine actual dimensions of the objects and define the objects according to the dimensions and type (e.g., truck pulling a 5 m long trailer, etc.).

Moreover, the type classification itself, in at least one embodiment, may further facilitate the detection module 220 predicting future positions, determining blind spots, determining confidence levels of estimated paths, and so on. That is, for example, the detection module 220 may predict movements of the object according to a particular type/class. By way of example, the detection module 220 may apply intuition according to the type including maintaining particular lane assignments (e.g., bike lanes for bicycles, etc.), predicting speeds or potential speed categories (e.g., average speeds of pedestrians), erratic movements of children, and so on. Thus, in one or more embodiments, the detection module 220 adapts a restricted zone associated with the trailer according to a type of the nearby object. That is, in a circumstance where, for example, the detection module 220 identifies the object as a child, the detection module 220 may adapt a restricted zone of the trailer in order to further restrain activation of the driving assistance system 160 due to potential erratic movements toward the trailer that would otherwise trigger the system 160.

With continued reference to FIG. 2, in one embodiment, the warning module 230 generally includes instructions that function to control the processor 110 to determine whether the collision probability satisfies an activation threshold. In one embodiment, the activation threshold varies according to the particular function of the driving assistance system 160. For example, a safe exit alert function generally defines different activation zones and timing in comparison to a rear cross-traffic alert function or a blind spot monitoring function. Thus, the warning module 230 generally uses the separate activation zones and/or other thresholds as modified in the system parameters 260 according to the trailer.

The warning module 230, in response to determining the nearby object satisfies the activation threshold for at least one function of the driving assistance system 160, determines whether the estimated path intersects with the restricted zone of the trailer. That is, the warning module 230, in at least one approach, may separately assess an activation threshold for each separate function and determine whether the nearby object satisfies the threshold. By way of example, in the instance of rear cross-traffic alerting functionality, the warning module 230 determines whether the vehicle 100 is in reverse, whether the estimated path of the nearby object intersects with an activation zone behind the vehicle 100 (e.g., a rectangular region beyond the trailer and extending to the sides), and whether the nearby object is predicted to be within the activation zone within a defined time. When the noted conditions are satisfied, the warning module 230 indicates that the nearby object satisfies the activation threshold.

However, instead of delivering the output (e.g., providing vehicle controls, generating an alert, etc.), the warning module 230 further assesses the estimated path of the nearby object in relation to the trailer. The warning module 230, in one approach, determines whether the estimated path intersects with the restricted zone of the trailer. If the nearby object intersects with the restricted zone, this generally indicates that the nearby object is to pass through an area occluded by the trailer and thus may not be able to be tracked by the sensors of the vehicle 100. In other words, the trajectory of the nearby object is estimated to intersect the restricted zone/the trailer, but it is generally understood that the nearby object will not likely impact the trailer and, instead will pass close by the trailer and through an area that is occluded by the trailer. Thus, the warning module 230 restrains activation of the driving assistance system 160 since the nearby object cannot be tracked through the restricted zone. In further aspects, the warning module 230 may permit the driving assistance system 160 to activate an alternative alert that specifies this condition in order to improve awareness of a passenger/operator about the restrained functioning of the system 160, and the potential presence of the hazard associated with the nearby object.

If the estimated path of the nearby object does not intersect with the restricted zone, the warning module 230 activates the driving assistance system 160 to provide an alert or other output (e.g., vehicle controls). It should be appreciated that the warning module 230 generally permits the driving assistance system 160 to generate the output in various forms depending on the particular function that is activated. For example, the system 160 may automatically brake the vehicle 100 to avoid a collision, automatically steer the vehicle to maintain a lane, generate warnings/alerts in the form of audible alerts, visual alerts, and so on. The preceding are provided for purposes of explanation, and it should be appreciated that the scope of the noted outputs should not be construed as limited to the set of examples, but merely as generally representative of the scope of the outputs. Broadly, the outputs of the driving assistance system 160 correspond with alerts and controls as may be provided by safe exit alert (SEA) functions, blind-spot monitoring (BSM) functions, lane-keeping/changing assist (LCA) functions, rear cross-traffic alerts (RCTA), and so on.

Figure 3:
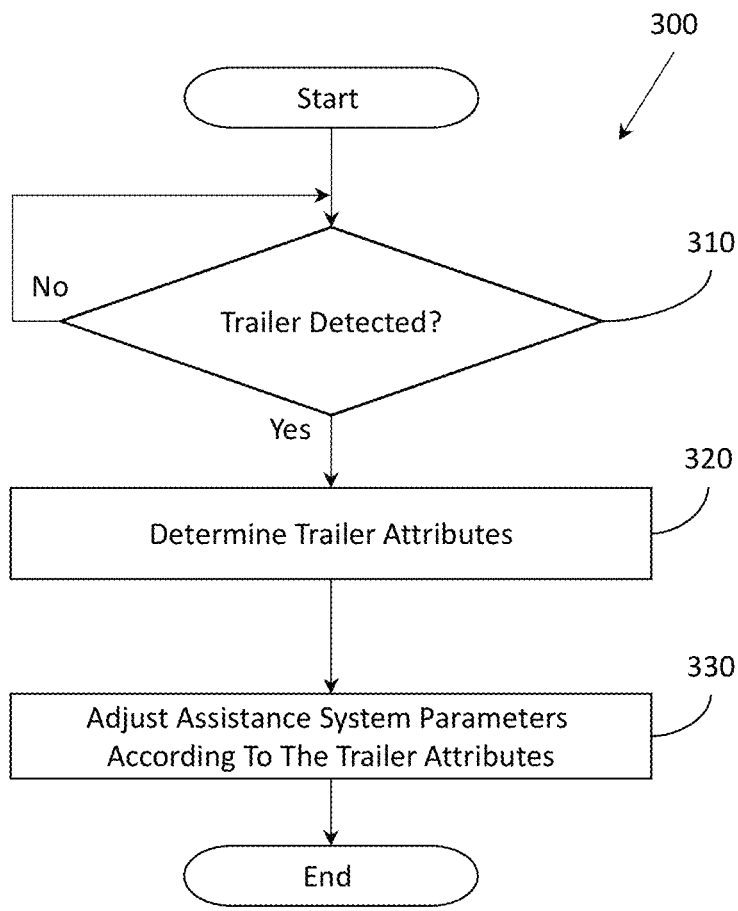
FIG. 3 illustrates one embodiment of a method associated with detecting the presence of a trailer and adjusting system parameters according to the trailer.

Additional aspects of detecting the presence of a trailer attached to the vehicle 100 will be discussed in relation to FIG. 3. FIG. 3 illustrates a method 300 associated with identifying when a trailer is attached to the vehicle 100. Method 300 will be discussed from the perspective of the trailer assistance system 170 of FIG. 1. While method 300 is discussed in combination with the trailer assistance system 170, it should be appreciated that the method 300 is not limited to being implemented within the trailer assistance system 170 but is instead one example of a system that may implement the method 300.

At 310, the detection module 220 monitors for the presence of the trailer. In one embodiment, the detection module 220 iteratively analyzes the sensor data 250 to identify whether the sensor data 250 includes a signature that corresponds with the attachment of a trailer. The signature may be in the form of a discrete signal associated with a sensor on a ball hitch or other mounting device of the vehicle 100. In one embodiment, the signature is associated with an electrical connection being formed between the vehicle 100 and the trailer (e.g., a connection for powering signaling lights, brakes, etc.). In one embodiment, the detection module 220 separately undertakes an image recognition process that analyzes images from a camera facing an area of the two-hitch and the trailer to identify when the trailer is connected with the vehicle 100. In an instant approach, the presence of the trailer may be manually identified to the vehicle 100 through a human-machine interface (HMI) device that generates electronic input signals when actuated specifying the presence of the trailer. In any case, upon the detection of the trailer, the detection module 220 proceeds to perform further functions, as discussed at block 320.

At 320, the detection module 220 determines the attributes of the trailer. In one embodiment, the attributes include at least a length and a width of the trailer, but may also include height. In further aspects, the attributes may define a weight and/or further attributes in addition to the overall dimensions. In any case, the detection module 220 uses the dimensions to generally assess how the trailer influences a field-of-view for the vehicle 100 and, in particular, sensors that the driving assistance system 160 uses to monitor various activation zones.

At 330, the detection module 220 adjusts the system parameters 260 according to the attributes of the trailer. The system parameters 260 control operation of the driving assistance system 160 by defining the various activation zones, timing thresholds, and other aspects associated with how the system 160 is activated. That is, the system parameters 260 generally indicate an activation threshold for each separate function of the system 160, and so by defining the zones/areas about the vehicle 100 within which a nearby object or estimated path of the nearby object is considered to be a hazard. In one aspect, the detection module 220 adapts one or more active regions of a field of view of the one or more sensors according to a restricted zone of the trailer. The restricted zone is generally a volume of the trailer and projected areas associated therewith relative to the line of sight of the relevant sensors on the vehicle 100. Thus, the restricted zone may include a footprint of the trailer or may extend beyond a footprint of the trailer where the line of sight of the sensor is blocked such that an occluded area extends past the trailer. The restricted zone generally functions as a mask for perceivable areas of the sensor such that the detection module 220 adapts the activation zones according to how the restricted zones align with the activation zones (i.e., overlapping areas are removed/masked from consideration). In this way, the detection module 220 adjusts the system parameters to prevent false-positive detections due to the presence of the trailer.

Figure 4:
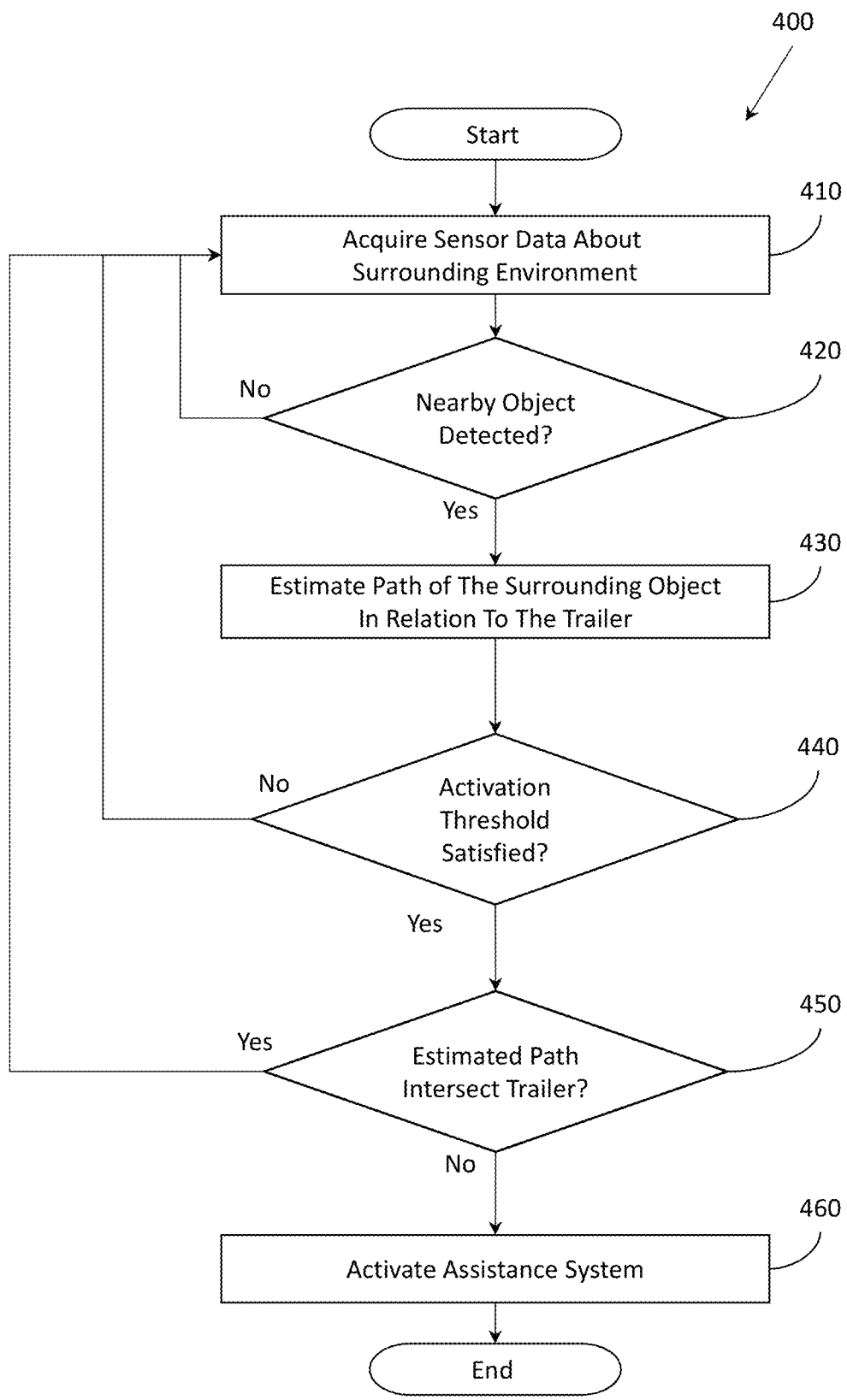
FIG. 4 illustrates one embodiment of a method associated with adapting the operation of a driving assistance system according to the presence of a trailer.

With reference to FIG. 4, at 410, the detection module 220 acquires the sensor data 250 about a surrounding environment of the vehicle 100. As previously noted, the detection module 220, in one or more implementations, iteratively acquires the sensor data 250 from one or more sensors of the sensor system 120. The sensor data 250 includes observations of a surrounding environment of the subject vehicle 100, including specific regions that are relevant to functions executed by the driving assistance system 160. Thus, the detection module 220 analyzes the sensor data 250 using one or more detection/identification routines that generally function to detect the presence of objects, classify/identify a type of the objects (e.g., vehicle, pedestrian, etc.), and localize the objects relative to the subject vehicle 100. Moreover, the detection module 220 may further derive additional information beyond the type and position of the surrounding objects, such as velocity information and other attributes that facilitate characterizing the objects and associated movements. In one or more implementations, the detection module 220 implements machine learning algorithms such as convolutional neural networks to identify/detect objects from the sensor data 250. Moreover, the detection module 220 may implement further routines to perform the localization such as simultaneous localization and mapping (SLAM) routines. In any case, the detection module 220 uses the sensor data 250 to acquire awareness about the surrounding environment including aspects relating to the surrounding objects.

At 420, the detection module 220 determines whether the sensor data 250 includes observations of any nearby objects. In one embodiment, the detection module 220 continuously monitors the observations of the sensor data 250 to determine when a nearby object is present. When detected, the detection module 220 proceeds with further actions, as discussed at block 430. As an additional note, in at least one embodiment, the detection module 220 may further adapt the system parameters 260 according to a type of the nearby objects. That is, the detection module 220 may classify the nearby objects according to various categories (e.g., vehicle, pedestrian, etc.) that are further assigned predictability metrics according to whether an object can be characterized with a common/consistent movement or if the object moves erratically. By example, in the instance of a child, wild animal, pet, etc. the object may be considered to have movements that are less predictable. Accordingly, the detection module 220 may extend the restricted zone of the trailer beyond an actual footprint of the trailer itself for the particular nearby object.

Figure 5:
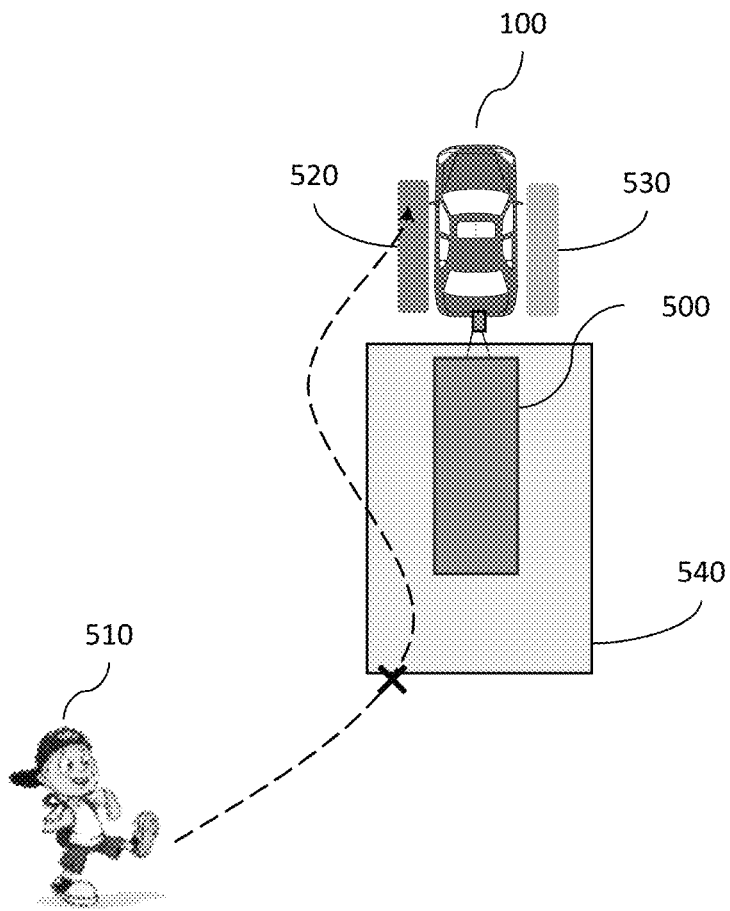
FIG. 5 illustrates a diagram of a restricted zone in relation to a trailer.

Briefly consider FIG. 5, which illustrates an instance of the vehicle 100 towing a trailer 500. As shown, the system 170 has detected the nearby object 510, which is classified as a pedestrian/child that is, for example, running near the vehicle 100. Activation zones 520 and 530 correspond with areas that the system 160 monitors for a safe exit alert (SEA) function. The SEA function provides alerts to passengers exiting the vehicle 100 about potential hazards from approaching dynamic objects such as vehicles, bicycles, running pedestrians, etc. Thus, as illustrated in the present example of FIG. 5, the estimated path for the pedestrian 510 is generally erratic and difficult to predict. However, the system 170 identifies that the estimated path passes into the activation zone 520, and, thus, satisfies the activation threshold for providing an alert. Yet, upon further analysis of the estimated path in relation to the restricted zone 540, the estimated path intersects the restricted zone, which is expanded due to the classified type of the object 510, and, thus, the alert is not generated.

Continuing with FIG. 4, at 430, the detection module 220 estimates a path of the nearby object. In one embodiment, the detection module 220 uses an instantaneous position and velocity to estimate the path. In further approaches, the detection module 220 may use multiple observations and apply a particular model to the observations according to, for example, the classification of the object to generate the estimated path. In any case, the estimated path is generally extrapolated out to a defined prediction horizon (e.g., 5.0 seconds) that is defined according to, for example, a sufficient time to alert a passenger/driver or perform other functions. Thus, the estimated path forecasts likely future movements of the nearby object in relation to the subject vehicle and the trailer.

At 440, the warning module 230 determines whether the estimated path satisfies an activation threshold. In one embodiment, the activation threshold is defined according to the system parameters 260 and includes at least an activation zone and a timing constraint/threshold. As previously indicated, the detection module 220 may adapt the activation zone according to the presence of the trailer. That is, the detection module 220 may adjust an area of an activation zone. Moreover, as previously noted, the threshold can include a timing component that indicates a time-to-collision (TTC) in relation to the activation zone that is to be met prior to issuing any action by the system 160. Thus, if the nearby object is predicted to be in the activation zone according to the estimated path within the defined timing constraint, then the warning module 230 determines the activation threshold to be satisfied.

Figure 6:
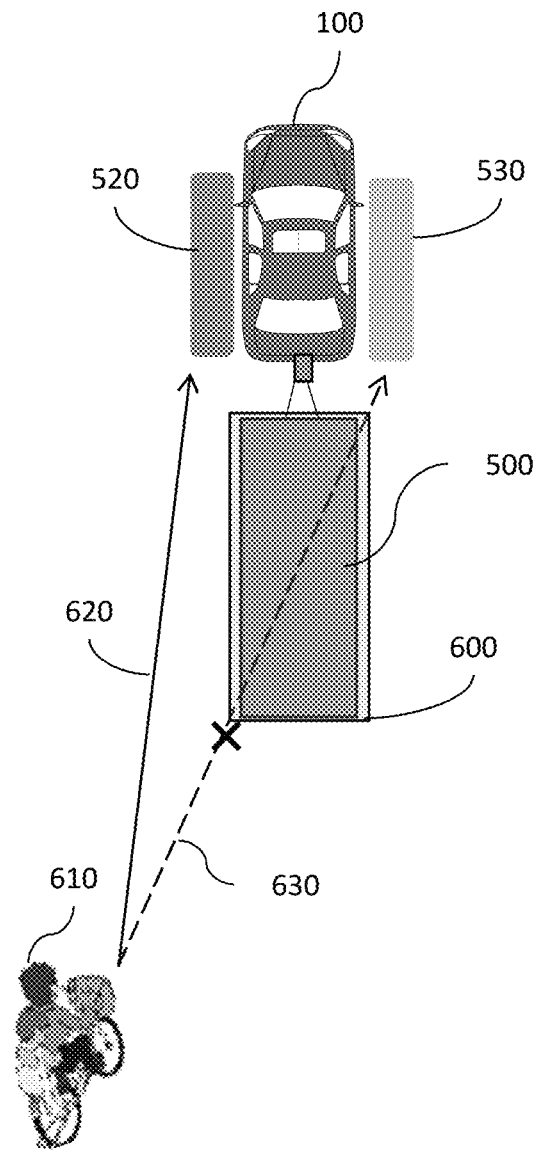
FIG. 6 illustrates one example of a safe exit alert (SEA) system operating in a vehicle that is towing a trailer.

As a further example, consider FIG. 6, which illustrates another example of a safe exit alert (SEA) function that may be implemented by the driving assistance system 160. As in FIG. 5, the vehicle 100 defines activation zones 520 and 530 along the sides of the vehicle 100, where a passenger may exit into oncoming hazards. As shown, the detection module 220 has defined a restricted zone 600 around the trailer. A detected nearby object 610 is approaching the vehicle 100 with two separate estimated paths 620 and 630 provided to illustrate different outcomes. For example, in the instance of the path 620, the warning module 230 determines that the path satisfies the activation threshold and doesn't intersect the trailer/restricted zone. Thus, the system 160 may provide an alert about the object 610 approaching. However, in the instance of the estimated path 630, while the path is projected to satisfy the activation zone 530, the path 630 intersects the restricted zone 600 of the trailer. Thus, as discussed further at 450, the system 170 restrains the driving assistance system 160 from delivering the alert.

At 450, the warning module 230 determines whether the estimated path intersects a restricted zone of the trailer. In one embodiment, the warning module 230 uses the estimated path in comparison to the restricted zone to determine whether the object is likely to pass an area where the sensors cannot reliably track the object. Thus, in such an instance that the estimated path does intersect the restricted zone, the trailer assistance system 170 restrains the functioning of the driving assistance system 160 to avoid issuing a false positive detection.

At 460, the warning module 230 activates the driving assistance system 160 according to the system parameters.

That is, the warning module 230 permits the driving assistance system 160 to generate output for a detected hazard, such as communicating an alert. In one embodiment, the warning module 230 activates lights/indicators of the subject vehicle 100 to visibly communicate the alert. In further aspects, the system 160 provides controls to control steering, braking, etc. of the vehicle 100. In this way, the trailer assistance system 170 improves the operation of the driving assistance system 160 when a trailer is connected with the vehicle 100 to facilitate the safety of the vehicle 100 and passengers thereof.

Figure 7:
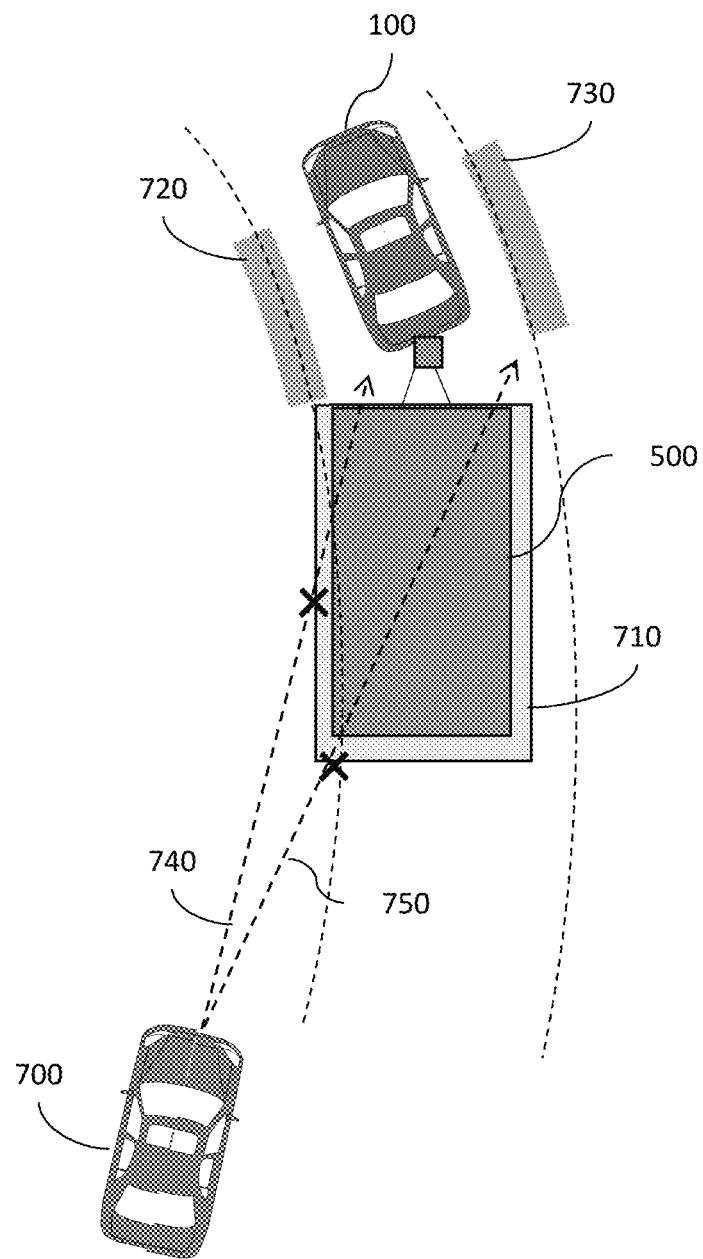
FIG. 7 illustrates one example of a lane change assist (LCA) system operating in a vehicle that is towing a trailer.
Figure 8:
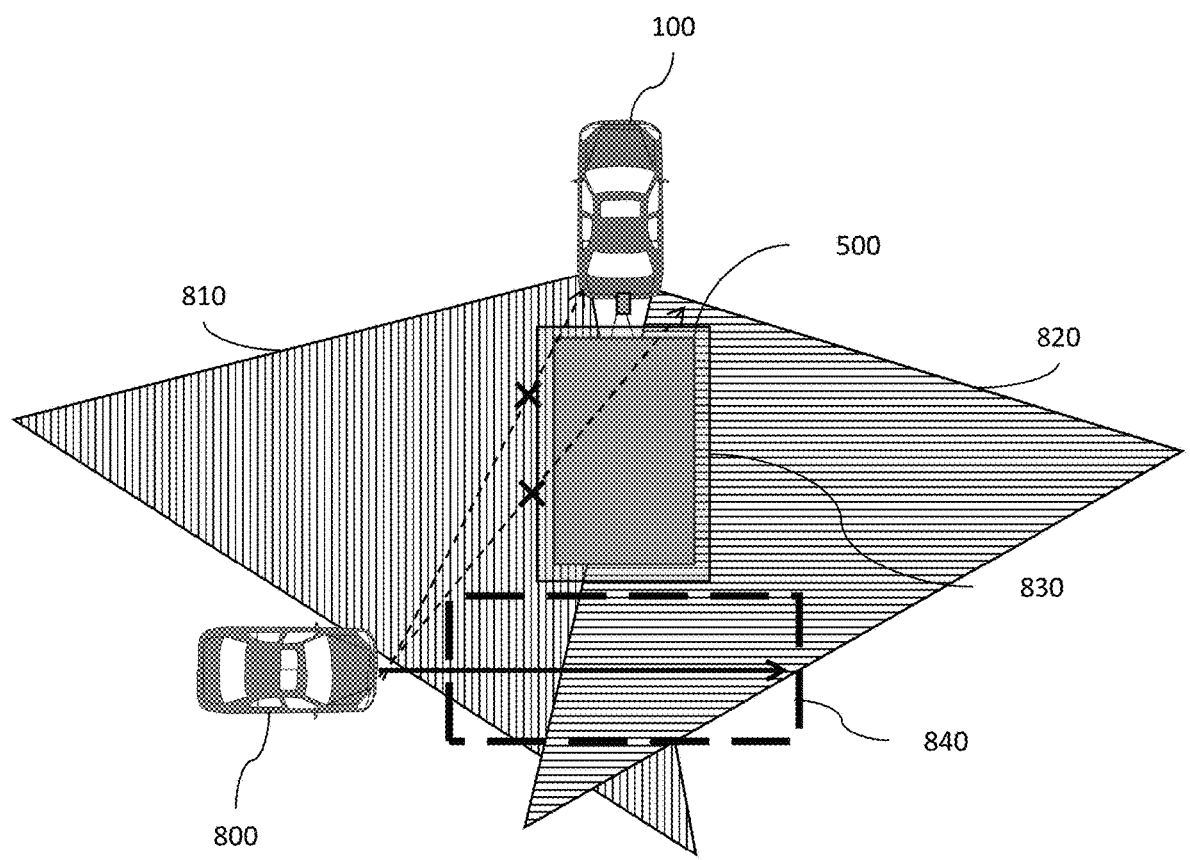
FIG. 8 illustrates one example of a rear cross-traffic alert (RCTA) system operating in a vehicle that is towing a trailer.

As a further explanation of how the presently disclosed systems and methods function, consider FIGS. 7-8. FIG. 7 illustrates an example of a lane change assist function of the driving assistance system 160. As shown in FIG. 7, a vehicle 700 is driving in a lane adjacent to a lane of the vehicle 100. Moreover, the detection module 220 defines a restricted zone 710 about the trailer 500. Activation zones 720 and 730 generally correspond to lane boundaries and the detection module 220 may further adapt the activation zones to account for the presence of the trailer 500, which, in one approach, includes shortening the zones 720 and 730 to account for a limited view of sensors due to the presence of the trailer 500. In any case, FIG. 7 illustrates how the system 170 restrains the operation of the driving assistance system 160 because of a limited ability to track the vehicle 700 due to occlusions from the trailer 500. Thus, whereas, the system 160 may generate an alert or control when the trailer 500 is present according to the estimated paths 740 and 750, when the trailer 500 is present, the system 170 restrains activation due to occlusions of the sensors.

As shown in FIG. 8, an additional example of the interoperability of the system 160 and the system 170 is illustrated. FIG. 8 illustrates a vehicle 800 as a detected nearby object that is passing behind the vehicle 100 and the trailer 500. The rear cross-traffic alert (RCTA) function defines activation zones 810 and 820 that generally align with a FOV for respective sensors. However, the restricted zone 830 adapts the activation zones 810 and 820 to mask an area directly behind the vehicle 100. Moreover, the restricted zone may be extended to an area represented by the box 840 when, for example, there is no sensor coverage in this region. In any case, as shown, estimated paths intersecting the restricted zone 830 are restrained from producing alerts, whereas further paths of the vehicle 800 may still be considered valid.

Additionally, it should be appreciated that the trailer assistance system 170 from FIG. 1 can be configured in various arrangements with separate integrated circuits and/or electronic chips. In such embodiments, the detection module 220 is embodied as a separate integrated circuit. Additionally, the warning module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies (e.g., method 300 of FIG. 3) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the trailer assistance system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the trailer assistance system 170, and/or the driving assistance system 160 can be operatively connected to communicate with the various vehicle systems 150 and/or individual components thereof. For example, returning to FIG. 1, the processor(s) 110, the trailer assistance system 170, and/or the driving assistance system 160 can be in communication to send and/or receive information from the various vehicle systems 150 to control the movement, speed, maneuvering, heading, direction, etc. of the vehicle 100. The processor(s) 110, the trailer assistance system 170, and/or the driving assistance system 160 may control some or all of these vehicle systems 150.

The processor(s) 110, the trailer assistance system 170, and/or the driving assistance system 160 may be operable to control the navigation and/or maneuvering of the vehicle 100 by controlling one or more of the vehicle systems 150 and/or components thereof. For instance, when operating in an autonomous mode, the processor(s) 110, the trailer assistance system 170, and/or the driving assistance system 160 can control the direction and/or speed of the vehicle 100. The processor(s) 110, the trailer assistance system 170, and/or the driving assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the trailer assistance system 170 and/or the driving assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the driving assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more driving assistance systems 160. The driving assistance system 160 can be configured to receive data from the sensor system 120 and/or any other type of system capable of capturing information relating to the vehicle 100 and/or the external environment of the vehicle 100. In one or more arrangements, the driving assistance system 160 can use such data to generate one or more driving scene models. The driving assistance system 160 can determine the position and velocity of the vehicle 100. The driving assistance system 160 can determine the location of obstacles, or other environmental features including traffic signs, trees, shrubs, neighboring vehicles, pedestrians, and so on.

The driving assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The driving assistance system 160 either independently or in combination with the trailer assistance system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The driving assistance system 160 can be configured to implement determined driving maneuvers. The driving assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The driving assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A trailer assistance system for adapting operation of a driving assistance system according to a presence of a trailer, comprising:
   one or more processors;
   a memory communicably coupled to the one or more processors and storing:
   a detection module including instructions that when executed by the one or more processors cause the one or more processors to adjust system parameters according to attributes of a trailer connected with a subject vehicle, wherein the system parameters control operation of the driving assistance system of the subject vehicle,
   wherein the detection module includes instructions to, in response to detecting a nearby object from sensor data about a surrounding environment of the subject vehicle, estimate a path of the nearby object, including generating the estimated path of the nearby object to forecast likely future movements of the nearby object in relation to the subject vehicle and the trailer; and
   a warning module including instructions that when executed by the one or more processors cause the one or more processors to activate the driving assistance system according to the system parameters when i) the estimated path satisfies an activation threshold and ii) the estimated path does not intersect a restricted zone of the trailer.

2. The trailer assistance system of claim 1, wherein the detection module includes instructions to adjust the system parameters including instructions to, in response to detecting the trailer being connected to the subject vehicle, determine the attributes of the trailer that define at least a length and a width of the trailer, and
   wherein the detection module includes instructions to adjust the system parameters including instructions to adapt at least one or more activation zones associated with the activation threshold.

3. The trailer assistance system of claim 2, wherein the detection module includes instructions to adjust the system parameters including instructions to adapt one or more active regions of a field of view of one or more sensors to mask the trailer, and prevent false-positive detections, and wherein the active regions are associated with the restricted zone of the trailer.

4. The trailer assistance system of claim 1, wherein the warning module includes instructions to activate the driving assistance system according to the system parameters including instructions to determine whether the estimated path intersects an activation zone proximate to the subject vehicle defined by the activation threshold, wherein the system parameters define the activation threshold as adapted according to the attributes of the trailer, and
   wherein the activation threshold defines a timing constraint and positional constraints of the activation zone.

5. The trailer assistance system of claim 1,
   wherein the detection module includes instructions to detect the nearby object including instructions to classify a type of the nearby object and further adapting the restricted zone of the trailer according to the type.

6. The trailer assistance system of claim 1, wherein the detection module includes instructions to detect the nearby object including instructions to, in response to receiving the sensor data, analyze the sensor data to identify at least a position and a velocity of the nearby object.

7. The trailer assistance system of claim 1, wherein the warning module includes instructions to activate the driving assistance system including instructions to perform one or more of: provide control inputs to control the subject vehicle, and generate an alert to inform one or more passengers of the vehicle about a hazard associated with the nearby object.

8. The trailer assistance system of claim 1, wherein the driving assistance system includes one or more functions for: lane-keeping assistance, rear cross-traffic detection, safe exit alerts, and blind spot monitoring, and
   wherein the detection module includes instructions to adjust the system parameters including instructions to adjust parameters that are associated with activation zones.

9. A non-transitory computer-readable medium storing instructions for adapting operation of a driving assistance system according to a presence of a trailer and that when executed by one or more processors, cause the one or more processors to:
   adjust system parameters according to attributes of a trailer connected with a subject vehicle, wherein the system parameters control operation of the driving assistance system of the subject vehicle;
   in response to detecting a nearby object from sensor data about a surrounding environment of the subject vehicle, estimate a path of the nearby object, including generating the estimated path of the nearby object to forecast likely future movements of the nearby object in relation to the subject vehicle and the trailer; and
   activate the driving assistance system according to the system parameters when i) the estimated path satisfies an activation threshold and ii) the estimated path does not intersect a restricted zone of the trailer.

10. The non-transitory computer-readable medium of claim 9, wherein the instructions to activate the driving assistance system according to the system parameters including instructions to determine whether the estimated path intersects an activation zone proximate to the subject vehicle defined by the activation threshold, wherein the system parameters define the activation threshold as adapted according to the attributes of the trailer, and
    wherein the activation threshold defines a timing constraint and positional constraints of the activation zone.

11. The non-transitory computer-readable medium of claim 9, wherein the instructions to adjust the system parameters including instructions to, in response to detecting the trailer being connected to the subject vehicle, determine the attributes of the trailer that define at least a length and a width of the trailer, and wherein the instructions to adjust the system parameters including instructions to adapt at least one or more detection zones associated with the activation threshold.

12. A method of adapting operation of a driving assistance system according to a presence of a trailer, comprising:

adjusting system parameters according to attributes of a trailer connected with a subject vehicle, wherein the system parameters control operation of the driving assistance system of the subject vehicle;

in response to detecting a nearby object from sensor data about a surrounding environment of the subject vehicle, estimating a path of the nearby object, including generating the estimated path of the nearby object to forecast likely future movements of the nearby object in relation to the subject vehicle and the trailer; and activating the driving assistance system according to the system parameters when i) the estimated path satisfies an activation threshold and ii) the estimated path does not intersect a restricted zone of the trailer.

13. The method of claim 12, wherein adjusting the system parameters includes, in response to detecting the trailer being connected to the subject vehicle, determining the attributes of the trailer that define at least a length and a width of the trailer, and wherein adjusting the system parameters includes adapting at least one or more activation zones associated with the activation threshold.

14. The method of claim 13, wherein adjusting the system parameters includes adapting one or more active regions of a field of view of one or more sensors to mask the trailer, and prevent false-positive detections, and wherein the active regions are associated with the restricted zone of the trailer.

15. The method of claim 12, wherein activating the driving assistance system according to the system parameters includes determining whether the estimated path intersects an activation zone proximate to the subject vehicle defined by the activation threshold, and wherein the system parameters define the activation threshold as adapted according to the attributes of the trailer, and wherein the activation threshold defines a timing constraint and positional constraints of the activation zone.

16. The method of claim 12, wherein detecting the nearby object includes classifying a type of the nearby object and further adapting the restricted zone of the trailer according to the type.

17. The method of claim 12, wherein detecting the nearby object includes, in response to receiving the sensor data, analyzing the sensor data to identify at least a position and a velocity of the nearby object.

18. The method of claim 12, wherein activating the driving assistance system includes one or more of: providing control inputs to control the subject vehicle, and generating an alert to inform one or more passengers of the vehicle about a hazard associated with the nearby object.

19. The method of claim 12, wherein the driving assistance system includes one or more functions for: lane-keeping assistance, rear cross-traffic detection, safe exit alerts, and blind spot monitoring, and wherein adjusting the system parameters includes adjusting parameters that are associated with activation zones.

* * * * *

UNITED STATES PATENT AND TRADEMARK OFFICE
CERTIFICATE OF CORRECTION

PATENT NO. : 11,351,993 B2
APPLICATION NO. : 16/745603
DATED : June 7, 2022
INVENTOR(S) : Ting-Yu Lai, Ryo Takaki and Bo Sun It is certified that error appears in the above-identified patent and that said Letters Patent is hereby corrected as shown below:

In the Claims

In Claim 7, replace "passengers of the vehicle" with -- passengers of the subject vehicle --.

In Claim 18, replace "passengers of the vehicle" with -- passengers of the subject vehicle --.

Signed and Sealed this
Thirteenth Day of December, 2022

*Katherine Kelly Vidal*

Katherine Kelly Vidal
*Director of the United States Patent and Trademark Office*